(12) United States Patent
Slivka et al.

(10) Patent No.: US 7,467,653 B1
(45) Date of Patent: Dec. 23, 2008

(54) AIRCRAFT TIRE WITH IMPROVED HIGH SPEED PROPERTIES

(75) Inventors: John Joseph Slivka, Danville, VA (US); Thomas William Cooper, Hartville, OH (US); Hal Warren Stilley, Jr., Danville, VA (US); Oscar Allen Hash, Danville, VA (US); Jerome Wesley Ward, Danville, VA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/297,589

(22) PCT Filed: Nov. 27, 1996

(86) PCT No.: PCT/US96/19055

§ 371 (c)(1),
(2), (4) Date: Jun. 4, 2001

(87) PCT Pub. No.: WO98/23456

PCT Pub. Date: Jun. 4, 1998

(51) Int. Cl.
*B60C 9/26* (2006.01)
*B60C 9/18* (2006.01)

(52) U.S. Cl. ............................ 152/529; 152/528
(58) Field of Classification Search ............ 152/528, 152/529
See application file for complete search history.

(56) References Cited

U.S. PATENT DOCUMENTS 3,233,649 A * 2/1966 Jolivet et al. ............... 152/528
3,322,728 A * 5/1967 Hill, Jr. et al.
4,302,265 A * 11/1981 Cesar et al. ............. 152/528 X

FOREIGN PATENT DOCUMENTS

| DE | 19 43 842 A | | 3/1971 |
| EP | 0 479 065 A | | 4/1992 |
| FR | 2 617 087 A | | 12/1988 |
| GB | 1 364 426 A | * | 8/1974 |
| GB | 2 216 076 A | | 10/1989 |
| LU | 44 682 A | | 4/1964 |

OTHER PUBLICATIONS

English machine translation of DE 19 43 842 A, Mar. 18, 1971.*
Patent Abstracts of Japan, vol. 095, No. 004, May 31, 1995 & JP 07 009814 A (Toyo Tire & Rubber Co Ltd), Jan. 13, 1995.

* cited by examiner

*Primary Examiner*—Adrienne C Johnstone
(74) *Attorney, Agent, or Firm*—June E. Rickey

(57) ABSTRACT

An aircraft tire having a folded belt construction and a belt edge strip over the folded belt construction has improved high speed properties. The belt edge strip substantially covers the top surface and/or the bottom surface of the folded belt in addition to the folded belt edges. The folded belt construction is reinforced with high modulus materials, and the belt edge strip is reinforced with low modulus materials. In a method of the invention, plies which make up the belt reinforcement package are applied to a belt building drum while the building drum is at different diameters to minimize stresses on the belt package. In a method of building a tire of the invention, a tire carcass on a tire building drum is expanded to the belt package.

5 Claims, 1 Drawing Sheet

AIRCRAFT TIRE WITH IMPROVED HIGH SPEED PROPERTIES

TECHNICAL FIELD

The invention relates to an aircraft tire with improved retreadability and improved high speed properties.

BACKGROUND ART

In the prior art, nylon is a preferred reinforcement material for aircraft tires because it is forgiving and is not as subject to fatigue as other available materials. Nylon reinforcement, however, does not have superior strength and many plies of nylon are needed in the construction of an aircraft tire.

It is known in the art to build aircraft tires using aramid reinforcement, but such tires, although they can be constructed using fewer plies and have better wear than a nylon reinforced tire, are generally considered to be harder to qualify at high speeds and are not used in high speed applications.

Prior art tires have been constructed using a nylon reinforced carcass and a folded aramid belt reinforcement in the crown area of the tire. Such tires wear well, but they are generally accepted for use only at speeds up to about 190 mph, although applicant on several occasions has run successful tests on the tires up to about 210 mph. Such tires, however, show a high level of rejection for first retreading since folded edges of the folded belt show large numbers of separations when the tread is removed. Economical use of aircraft tires is highly dependant on the number of times an aircraft tire can be retreaded.

It is an object of the present invention to provide a tire construction which shows good wear and retreadability yet has improved high speed potential. Other objects of the invention will be apparent from the following specification and claims.

SUMMARY OF THE INVENTION

An aircraft tire of the invention has at least one pair of parallel annular beads, at least one carcass ply wrapped around the beads, high modulus belt reinforcement disposed over the carcass ply in a crown area of the tire, tread disposed over the belt reinforcement, and sidewalls disposed between the tread and the beads, wherein the improvement comprises a layer of low modulus reinforcement material wrapped around the edges of the high modulus belt reinforcement. The high modulus belt reinforcement comprises high modulus reinforcement cords encapsulated in rubber to form a substantially two dimensional belt ply having length and width, and the layer of low modulus reinforcement comprises low modulus reinforcement cords or filaments encapsulated in rubber to form a substantially two dimensional belt edge strip having length and width. The belt structure in the illustrated embodiment is a belt ply folded into a folded belt structure wherein the belt ply has a width about twice the width of the folded belt structure. In one embodiment of the invention, the belt edge strip has substantially the same width as the belt ply and is folded completely around the folded belt structure. In another embodiment, the belt edge strip has a width about five-eights to seven-eights of the width of the belt ply and is placed radially inward of the folded belt, and the width edges of the belt edge strip are folded radially outward of the folded belt structure over the folded belt edges. In another alternative embodiment, the belt edge strip comprises split belt edge layers having a combined width of about five-eights to seven-eights of the width of the ply used to form the folded belt structure wherein one edge of each split layer is disposed radially inward of the belt ply and the distal end of each split layer is folded radially outward of the folded belt structure, substantially completely covering the radially outer surface of the folded belt structure.

In a specific illustrated embodiment of the invention, the high modulus reinforcement cords are aramid, the low modulus reinforcement cords are nylon and the high modulus reinforcement cords are disposed in a tire construction at an angle of ±15 to ±25° with respect to the equatorial plane (EP) of the tire and the low modulus reinforcement cords are aligned in the same general direction as the high modulus reinforcement cords and are disposed at an angle of ±15 to ±29° with respect to the EP of the tire.

Also provided is a method of building the tires of the invention, comprising the steps of reducing the diameter of a belt building drum below that required for assembly of a belt reinforcement package for a tire, applying a belt edge strip ply on the belt building drum, expanding the diameter of the belt building drum to a diameter which is still less than the diameter required for the tire, applying a belt ply over the belt edge strip ply on the belt building drum, expanding the diameter of the belt building drum to the diameter required for the belt of a tire, applying cut belts over the belt ply on the building drum, folding the belt ply and the belt edge strip ply over the cut belts, expanding a tire carcass to the belt package, and adding tread and sidewalls and any other external components required to complete the tire construction.

A method of building a belt package using the above steps is also provided.

DETAILED DESCRIPTION OF THE INVENTION

Figure 1:
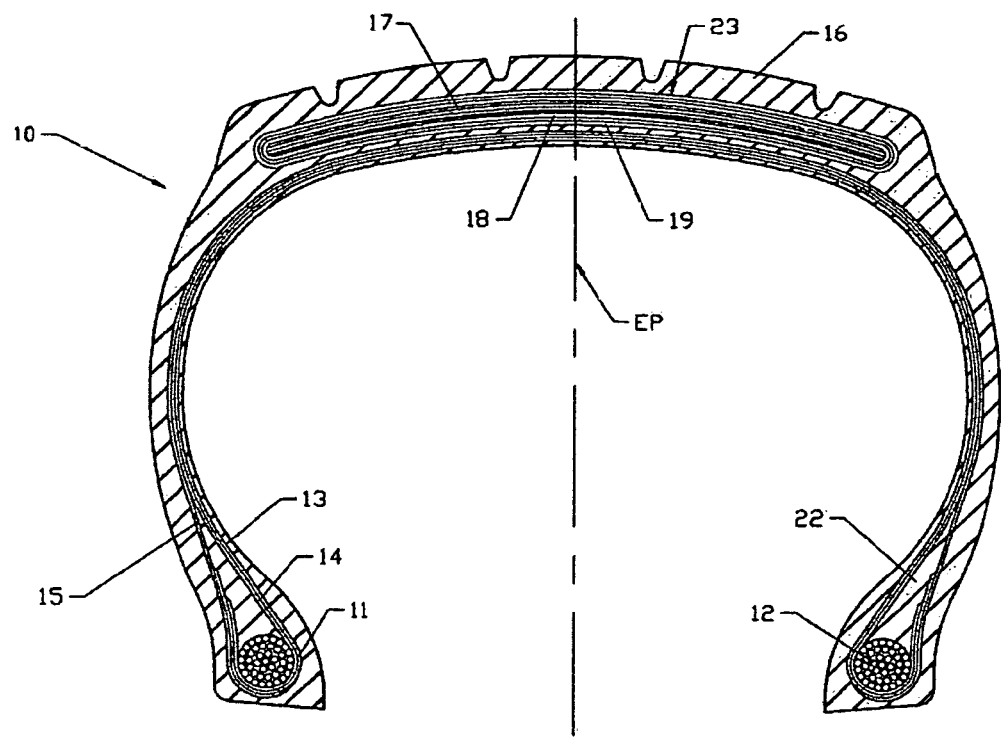
FIG. 1 illustrates a cross section of a tire of the invention.

With reference to FIG. 1, in an illustrated embodiment, an aircraft tire 10 of the invention comprises a pair of parallel annular beads 12, carcass ply 13 wrapped around the beads, optional apex 22 above the bead and between the carcass ply and the carcass ply turnup, optional flipper 11 protecting the bead area, optional inner liner 14 radially inward of the carcass ply, reinforcement package 23 comprising folded belt 18 wrapped around cut belts 17 and low modulus reinforcement ply 19 wrapped around folded belt 18 disposed over carcass ply 13 in a crown area of the tire, tread 16 disposed radially above reinforcement package 23, and sidewalls 15 disposed between the tread and a bead area of the tire.

Those skilled in the art will recognize that aircraft tires are made with up to 4 pairs of beads and up to 12 carcass plies and up to 12 belt plies depending on their intended use.

Cut belts 17 and folded belt 18 comprise high modulus reinforcement cords embedded in rubber. Two to five cut belts can be used in the tire of the invention. In the illustrated embodiment, three cut belts having an end count of 14 to 22 e.p.i. are used. The ply used to form folded belt 18 also has an end count of 14 to 22 e.p.i.

The high modulus cords used in the invention may be, for example, aramid or steel, or any other high modulus material having similar properties, or a combination of such high modulus materials. Such reinforcement cords can comprise any suitable denier and any suitable twist. Such high modulus cords may be treated to increase their bond strength to rubber, and aramid reinforcement cords may be coated with an adhesive or an adhesive/epoxy combination. The high modulus cords used in the illustrated embodiment are 1500/3 denier aramid and have a twist of 6.9/6.9.

Those skilled in the art will recognize that in a folded ply construction, cord reinforcement in the folded over part of the ply will have an equal but opposite angle with respect to the EP of the tire as the non folded over portion of the ply. As used herein, the angle of reinforcement cords in a folded ply will be indicated with a plus/minus (±) in front of the angle. Angles of cords in other reinforcement plies in the tire will be given an absolute value, regardless of their general direction of orientation, it being understood that in most, but not all cut belt constructions, reinforcement cords in alternate cut belts are oriented in the opposite direction with respect to the EP of the tire. In the illustrated embodiment, the angle of the reinforcement cords in the cut belts 17 are at an angle of 12 to 22° with respect to the EP of the tire and reinforcement cords in alternate cut belts have the opposite angle of orientation.

In the illustrated embodiment, aramid cords coated with an RFL adhesive and an end count of 20 e.p.i. were used, and the ply used to form folded belt 18 was incorporated into the tire wherein the reinforcement cords were oriented at an angle of ±18° with respect to the EP of the tire. In the illustrated embodiment, the tire is a radial ply tire wherein the reinforcement cords in the cut belt plies are oriented at an angle of 15° with respect to the EP of the tire.

Low modulus reinforcement ply 19 comprises low modulus reinforcement cords or filaments embedded in rubber and having an end count of 14 to 22 e.p.i.

Low modulus cords or filaments of, for example, nylon can be used in the construction of belt edge reinforcement 19. Such reinforcement cords can comprise any suitable size and twist, and in the illustrated embodiment, 840/2 denier nylon cords with a twist of 12/12 were used and incorporated in the ply at an end count of 21 e.p.i.

The angle of the low modulus reinforcement cords or filaments in the low modulus reinforcement ply 19 may be oriented in the tire having the same angle with respect to EP as the high modulus reinforcement cords in ply 18 up to an angle 4° greater than such high modulus cords and, accordingly, may be angled at ±15 to ±29° with respect to the EP of the tire, and in the illustrated embodiment were oriented at the same angle as the reinforcement cords in folded belt 18.

Tires tested according to the invention were made using cable beads and a carcass construction comprising two turn-up plies and one turn-down ply. It is believed that the belt package reinforcement described will work with any conventional aircraft tire construction.

For the purposes of this invention, the belt ply and the belt edge strip plies are substantially two dimensional, those skilled in the art being aware that such plies are about 8 to 12 mm thick. For the tire in the illustrated embodiment, the full width of the ply used to form folded belt 18 is 9.8 inches and the width of the ply used to form belt edge strip 19 is 10.1 inches, and the length of both plies is about 74 inches, it being understood that the length and width can vary depending on the size of the tire and the tire construction in which the described belt reinforcement package is used.

The belt edge strip substantially covers the radially outermost surface and/or the radially innermost surface of the folded belt in addition to the folded belt edges.

Figure 3:
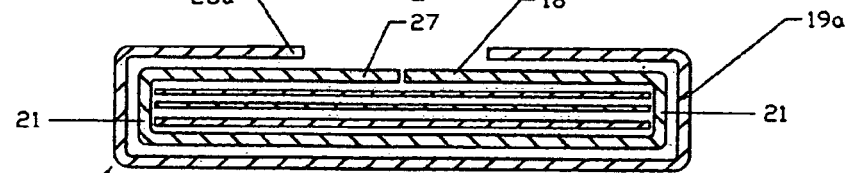
FIG. 3 illustrates an alternative reinforcement construction for the crown area of the tire.
Figure 4:
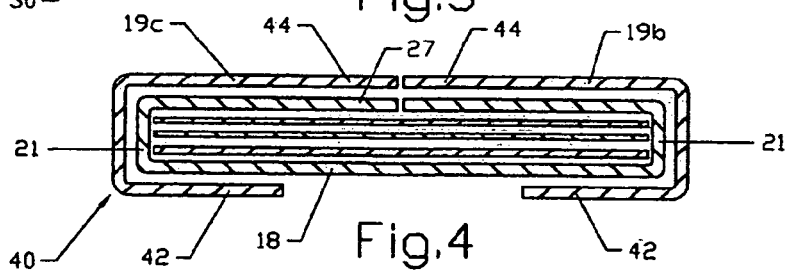
FIG. 4 illustrates a second alternative construction for crown area reinforcement of the tire.

In various illustrated embodiments, belt edge strip 19 may be applied to fully encompass folded belt 18 (FIG. 2), to be placed in the tire radially below ply 18 wherein the ply ends 25 are folded around the folded ends 21 of folded belt 18 (FIG. 3), or provided in split layers wherein the ends 42 of ply 19 radially below belt 18 cover the folded ends 21 of belt 18 and the distal ends 44 thereof are folded over ply 18 to fully encompass the radially outward portion thereof (FIG. 4). In general, the ply used to form belt edge strip 19 may have the same width or about five-eights to seven-eights of the width of the ply used to form folded belt 18.

In building the tires of the invention, it has been found that the various ply used to make reinforcement package 23 tend to tangle and bunch if their actual length is not adjusted to reflect their actual relationship in the tire. For example, since the belt edge ply is the radially innermost belt package ply in the tire, its actual diameter in a completed tire is slightly less than the diameter of the cut belt plies which are disposed radially above the belt edge strip ply, and if all the plies are the same length, the radially innermost ply bunches when the top layers are added or when the carcass is expanded to meet the belt package during the tire building procedure. Accordingly, the method of building the tires of the invention comprises the steps of, reducing the diameter of a belt building drum below that required for building a belt, applying a belt edge strip ply to the belt building drum, expanding the diameter of the belt building drum to a diameter which is still less than the diameter required for building a tire, applying a belt ply over the belt edge strip ply on the belt building drum, expanding the diameter of the belt building drum to the diameter required for building a belt package for a tire, applying cut belts over the belt ply on the building drum, folding the belt ply and the belt edge strip ply over the cut belts, expanding the tire carcass to the belt package, and adding tread and sidewalls and any other external components required to complete the tire construction.

The belt package described herein may be useful in other types of tires and also provided is a method of building a belt package, said method comprising the steps for building a belt package described above.

Conventional tire building equipment may be used to carry out the method of the invention without modification. The tire construction is completed as is otherwise known in the art.

For purposes of illustration, a belt edge strip ply may have a length of about 73.5 inches, a ply for a folded belt may have a length of about 74 inches, and the cut belts may have a length of about 74.5 inches.

Figure 2:
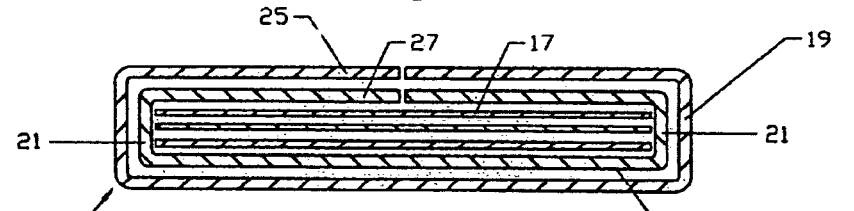
FIG. 2 illustrates one embodiment of a belt of the tire encompassed by a low modulus reinforcement ply for reinforcing the crown area of the tire.

The belt edge ply and the belt ply are folded at the same time in the tire building procedure, and when the belt edge ply and the belt ply are the same width, a construction where a folded high modulus belt is encapsulated by a belt edge strip is formed as illustrated in FIG. 2. When the belt edge strip ply is not as wide as the belt ply, a construction similar to that illustrated in FIG. 3 is obtained using the same technique. To form the construction illustrated in FIG. 4, two split layers of belt edge strip are applied to the building drum wherein a first end 42 of belt edge strip 19*b* and 19*c* are applied to the drum followed by application of the belt ply to the drum, and distal ends 44 of split ply 19*b* and 19*c* are folded at the same time as the belt ply to form folded belt 18 and a reinforcement package including belt edge strips 19*b* and 19*c*.

In the embodiment illustrated in FIG. 3, the ply used as the belt edge reinforcement 19*a* is about three-fourths as wide as the ply used to form belt 18. In FIG. 4, the combined width of belt edge plies 19*b* and 19*c* is about three-fourths of the width of the ply used to form belt 18.

As illustrated in FIG. 2, it is preferred that the folded ends 27 of the ply used to form folded belt 18 and ply ends 25 of belt edge reinforcement 19 be in abutment at the EP of the tire, but those skilled in the art will recognize that the ends 27 of the belt ply and ends 25 of the belt edge strip ply can be off-set from the EP of the tire, and in some applications, the belt ply ends 27 and belt edge strip ply ends 25 may be short of abutment or may form an overlap splice.

Aircraft tires of the kind illustrated herein are qualified by a step load test where tires at a specific load are run at various increasing speed steps up to a maximum, and under an increased load are run through the speed steps again. A tire qualifies if it finishes intact 61 cycles of this test at the designated loads and speeds.

Tires of the invention have been preliminarily qualified at speeds of 210 mph in a radial aircraft tire size 26×6.6R14 14PR, and it is believed that such tires will qualify at 225 mph. It is believed also that retreadability will be increased substantially. It has been shown that tires of the invention show increased tread wear as compared to similarly constructed tires using nylon belt reinforcement.

While the invention has been variously illustrated and described, those skilled in the art will recognize that the invention may be variously modified and practiced. The scope of the invention is limited only by the following claims.

The invention claimed is:

1. An aircraft tire comprising at least one pair of parallel annular beads, at least one carcass ply wrapped around said beads, a folded high modulus belt reinforcement disposed over said carcass ply in a crown area of said tire, a tread disposed over said belt reinforcement and sidewalls disposed between said tread and said beads, a layer of low modulus reinforcement material wrapped around the folded edges of said high modulus belt reinforcement wherein said high modulus belt reinforcement comprises high modulus reinforcement cords encapsulated in rubber to form a substantially two dimensional belt ply having length and width, and said layer of low modulus reinforcement comprises low modulus reinforcement cords or filaments encapsulated in rubber to form a substantially two dimensional belt edge ply strip having length and width, and said high modulus reinforcement is a belt ply folded into a folded belt structure wherein the belt ply has a width about twice the width of the folded belt structure, wherein said belt edge strip has a width about five-eights to seven eights of the width of said belt ply and is radially below said folded belt, and the edges of said belt edge strip are folded radially above said folded belt structure.

2. The aircraft tire of claim 1 wherein said high modulus reinforcement cords are aramid.

3. The aircraft tire of claim 1 wherein said low modulus reinforcement cords are nylon.

4. The aircraft tire of claim 1 wherein said high modulus reinforcement cords are disposed in a tire construction at an angle of ±15 to ±25° with respect to the equatorial plane (EP) of the tire and said low modulus reinforcement cords are aligned in the same general direction as said high modulus reinforcement cords and are disposed at an angle of ±15 to ±29° with respect to the EP of the tire.

5. An aircraft tire comprising at least one pair of parallel annular beads, at least one carcass ply wrapped around said beads, a folded high modulus belt reinforcement disposed over said carcass ply in a crown area of said tire, a tread disposed over said belt reinforcement and sidewalls disposed between said tread and said beads, a layer of low modulus reinforcement material wrapped around the folded edges of said high modulus belt reinforcement wherein said high modulus belt reinforcement comprises high modulus reinforcement cords encapsulated in rubber to form a substantially two dimensional belt ply having length and width, and said layer of low modulus reinforcement comprises low modulus reinforcement cords or filaments encapsulated in rubber to form a substantially two dimensional belt edge ply strip having length and width, wherein said high modulus reinforcement is a belt ply folded into a folded belt structure wherein the belt ply has a width about twice the width of the folded belt structure, wherein said belt edge strip comprises split belt edge layers having a combined width of about five-eights to seven eights of the width of said belt ply wherein one edge of each split layer is disposed radially below said folded belt and the distal end of each split layer is folded radially above the folded belt structure substantially completely covering the radially outer surface of said folded belt structure.

* * * * *